United States Patent
Fan et al.

(10) Patent No.: US 6,722,209 B1
(45) Date of Patent: Apr. 20, 2004

(54) CORIOLIS FORCE TYPE FLOW METER USING OPTICAL INTERFEROMETER

(75) Inventors: Cheng-Wen Fan, Tainan (TW); Chin-Chung Nien, Hsinchu (TW); Tsung-Tu Gwo, Taipei Hsien (TW); Kao-Hone Chu, Kaohsiung (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 10/305,142

(22) Filed: Nov. 27, 2002

(51) Int. Cl.[7] .................................................. G01F 1/78
(52) U.S. Cl. ............................................... 73/861.355
(58) Field of Search ..................... 73/861.356, 861.355, 73/861.357

(56) References Cited

U.S. PATENT DOCUMENTS

| | | | | |
|---|---|---|---|---|
| 3,614,677 A | * | 10/1971 | Wilfinger | 333/200 |
| 4,317,611 A | * | 3/1982 | Petersen | 359/214 |
| 4,421,381 A | * | 12/1983 | Ueda et al. | 359/214 |
| 6,412,355 B1 | * | 7/2002 | Haberli et al. | 73/861.356 |
| 6,467,345 B1 | * | 10/2002 | Neukermans et al. | 73/504.02 |

* cited by examiner

*Primary Examiner*—Edward Lefkowitz
*Assistant Examiner*—Jewel V. Thompson
(74) *Attorney, Agent, or Firm*—Birch, Stewart, Kolasch & Birch, LLP

(57) ABSTRACT

A Coriolis force type flow meter uses an optical interferometer as the measuring device. When a tube that a fluid flows through experiences a bending vibration caused by an external stimulating source, the tube also has a twist vibration due to the action of the Coriolis force. The optical interferometer is then employed to measure the tiny angular change in the amplitude of the tube vibration. From such a measurement, one can determine the flux of the fluid in the tube.

7 Claims, 2 Drawing Sheets

CORIOLIS FORCE TYPE FLOW METER USING OPTICAL INTERFEROMETER

BACKGROUND OF THE INVENTION

1. Field of Invention

The invention relates to a Coriolis force type flow meter and, in particular, to a Coriolis force type flow meter that uses an optical interferometer as its measuring device.

2. Related Art

In many manufacturing processes or applications that require flow control, the first thing that one has to do is to precisely measure and control the flux in order to properly make desired products. For example, in the biochemical technology the formation of a chemical compound requires two or more substances mixed in a specific ratio. Another example is that in motor engines, the gasoline and air have to be mixed in an appropriate ratio to achieve an optimal efficiency.

Currently, most flow meters utilize the changes in pressure, temperature or acoustic wave propagation of the fluid flowing through a tube to determine the flux. According to different measuring methods, the flow meters can be categorized as the thermal, pressure-difference and ultrasonic types. The physical quantity obtained from the above-mentioned flow meters is normally the flow speed (meters per second) or volume flux (cubic meters per second). Once the density of the fluid is known, the mass flux of the fluid can be readily calculated.

However, the fluid flow measuring method of the above-mentioned flow meters is indirect. The precision of the measurement is very likely affected by changes of the fluid properties, such as its temperature, pressure, density, viscosity, and homogeneity. Moreover, the precision may also be affected by the change in the distribution of the flow field.

To conquer the above drawbacks, Micro Motion, Inc first developed a flow meter that utilizes the principle of Coriolis forces in 1997. By directly or indirectly measuring the Coriolis force generated by the fluid flowing inside a rotational tube, one is able to obtain the mass flux of the fluid. This type of flow meter can directly measure the fluid flux inside the tube. The best advantage is: a high precision measurement can be achieved without being affected by changes in the fluid properties. Nevertheless, such a flow meter also has its shortcomings. In order to measure the tiny variation in the flow field caused by the Coriolis force, the size of the flow meter has to be large enough. A relatively complicated measuring device has to be used in order to achieve the high precision requirement. Therefore, the manufacturing cost of the flow meter increases and the product is not suitable for measurements in small flux fluid flows.

The method disclosed in the U.S. Pat. No. 6,412,355 uses basically the same idea as that of Micro Motion, Inc. However, the measurement is made through electrical signals from two different points in a tube. The flux inside the tube is obtained from its relation with the phase difference and the vibration frequency. As in the previous case, the size of this type of flow meter is larger and the device has a rather complicated structure. Therefore, it is not suitable for low fluid flow measurements either.

In the conference paper "A Coriolis Mass Flow Sensor Structure in Silicon" presented in 1996 IEEE Meeting, Enoksson et. al. proposed a new method of measuring the fluid flux by first projecting a laser beam on a double-loop tube in motion and the computing a rotation angle from the measurement of the position change of the reflected light on a photon detection apparatus. However, both positioning and calibration of the whole optical measuring system are not easy, the fact of which in turn affects the sensitivities. Therefore, one has to try to obtain compensations from other aspects, such as increasing the input voltage of the stimulator.

SUMMARY OF THE INVENTION

In view of the difficulties of using the above-mentioned flow meters to make measurements, an objective of the invention is to provide a Coriolis force type flow meter that uses a Fabry-Perot interferometer to measure the fluid flow inside a tube. Since the sensitivity of this type of optical interferometers can reach the micrometer order, it is ideal for measuring the minute flux changes inside a tube. AS the setup and calibration of the Fabry-Perot interferometer is not difficult at all, the manufacturing cost of the measuring device can be lowered. In contrast, such advantages increase the competition power of the disclosed Coriolis force type flow meter with others.

The Coriolis force type flow meter according to the invention has a substrate with stimulating electrodes for providing an electrostatic force and small holes symmetrically distributed on both sides of the stimulating electrodes. The substrate is installed with a symmetric rectangular loop tube, whose back end allows fluid to enter and/or leave. Its front end is installed above the stimulating electrodes. Driven by the electrostatic force provided by the stimulating electrodes, the rectangular loop tube starts bending vibrations.

The front end of the rectangular loop tube has through holes that are also symmetric, corresponding to the above-mentioned small holes. Several reflective mirrors are installed in the small holes and the through holes of the loop tube. A light source is provided above the through holes of the loop tube. A photo probe is installed under the small holes of the substrate.

The light emitted from the light source passes the reflective mirrors in the through holes and small holes. The photo probe extracts the interfered optical signals. After specific calculations, the fluid flow inside the rectangular loop tube can be obtained.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
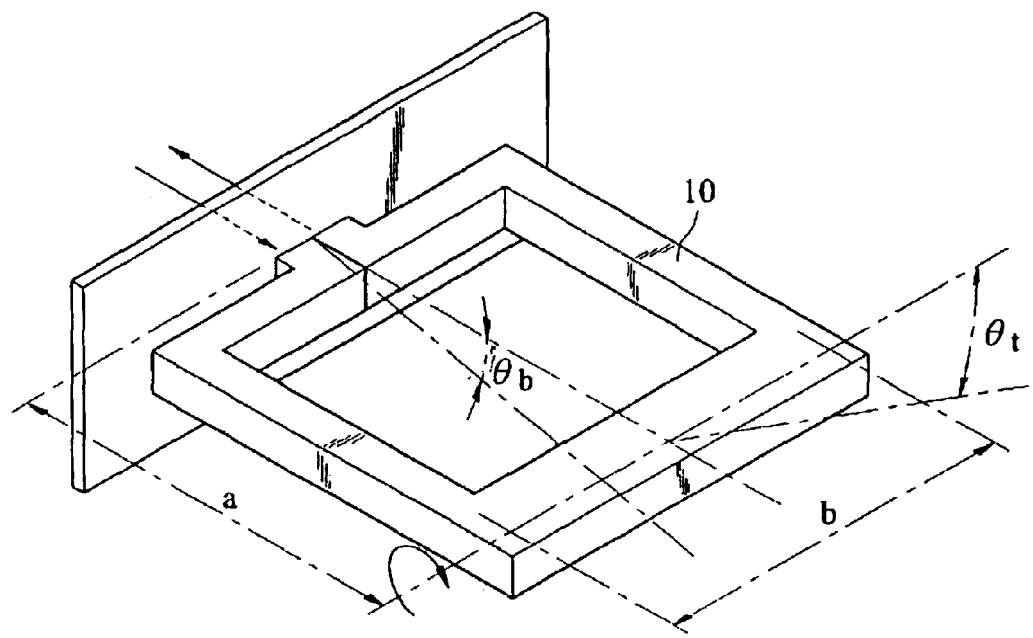
FIG. 1 shows the symmetric rectangular loop tube of the invention.

To measure tiny variations caused by the Coriolis force inside a flow meter, the invention provides a symmetric rectangular loop tube 10 shown in FIG. 1. First, a fluid flows through the loop tube 10. A stimulator exerts a force on the loop tube 10 so that the loop tube 10 undergoes bending vibrations. Due to the action of the Coriolis force, the loop tube 10 also generates twist vibrations at the same time.

Figure 2:
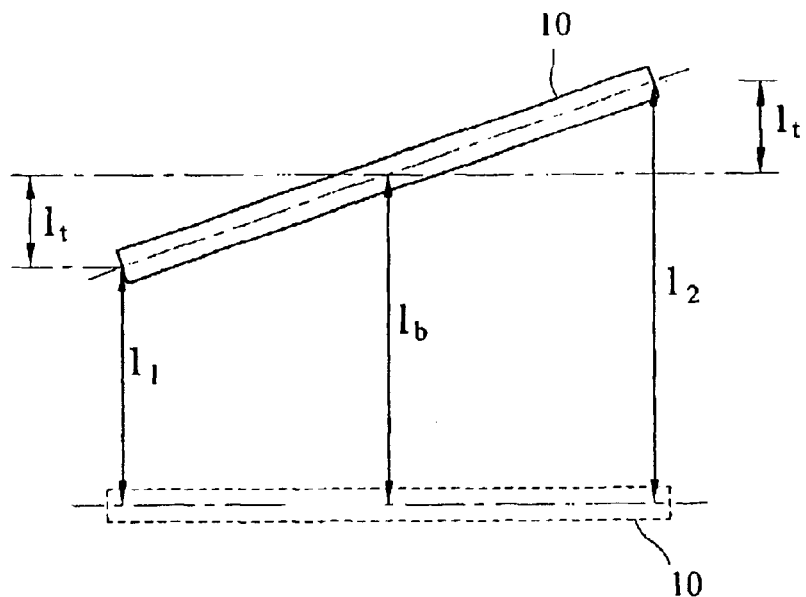
FIG. 2 is a cross-sectional view of the static and vibrating front end of the loop tube.

The cross sections of the static and vibrating front end of the loop tube 10 are shown in FIG. 2. The dashed lines in the drawing outline the front-end cross section of the static loop tube 10, whereas the solid lines outline the front-end cross section of the vibrating loop tube 10. By measuring the displacement of $1_1$ and $1_2$, one can compute the maximum vibration angle $\theta_b$ of the bending vibrations and the maximum amplitude angle $\theta_t$ of the twist vibrations from the following Eqs. (1) and (2):

$$l_b = \frac{l_1 + l_2}{2}, \quad \theta_b = \frac{l_b}{a} \quad (1)$$

$$l_t = \frac{l_2 + l_1}{2}, \quad \theta_t = \frac{l_t}{(b/2)} \quad (2)$$

The obtained angles $\theta_b$ and $\theta_t$ can be further used to determine the flux $\phi$ by putting into the following Eq. (3) that relates the flux $\phi$ with the angles $\phi_b$ and $\phi_t$:

$$\frac{\theta_t}{\theta_b} = \frac{4\pi f_0 ab}{k_s} \varphi \quad (3)$$

where a is the length of the loop tube 10, b is its width, c is the vibration frequency, and k is the torsional spring stiffness.

Figure 3:
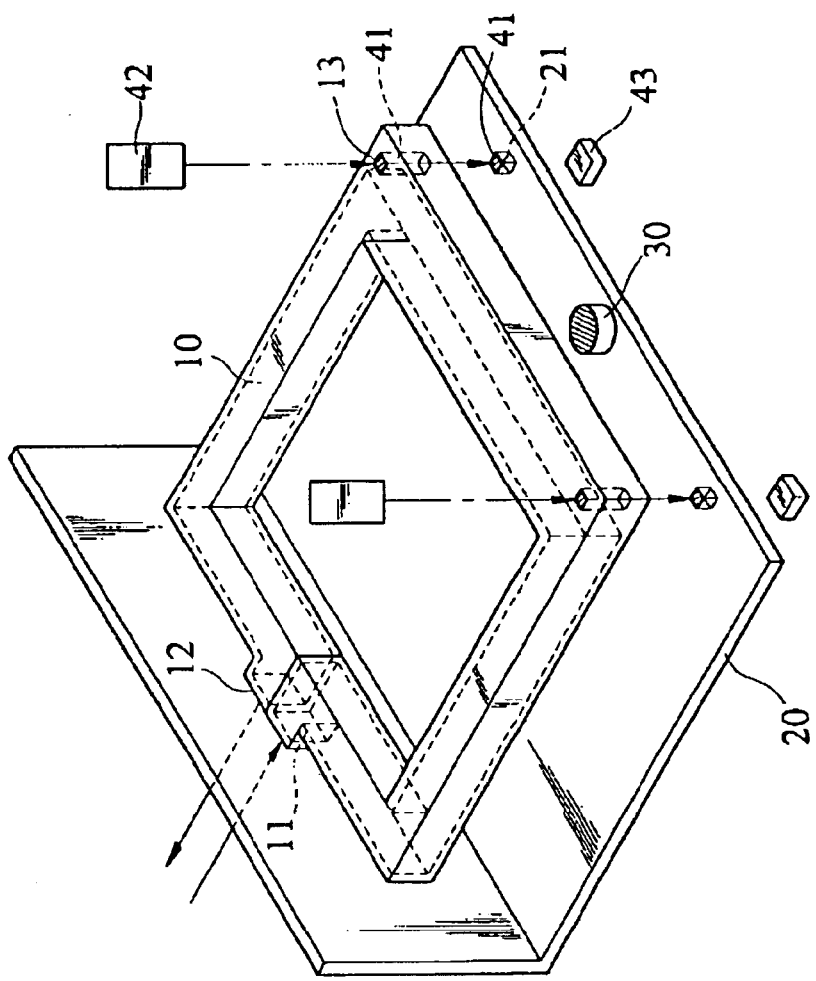
FIG. 3 shows a schematic structure of the Coriolis force type flow meter that utilizes a Fabry-Perot interferometer according to the invention.

The structure of the disclosed Coriolis force type flow meter is shown in FIG. 3. A symmetric rectangular loop tube 10 is mounted on a substrate 20. The fluid enters the loop tube 10 via the inlet 11 and leaves via the outlet 12 on the back. The flowing path is a symmetric rectangle.

The cross section of the loop tube 10 can be of any geometric shape that is adjusted taking into account the size and manufacturing process of the flow meter. Taking a micro tube as an example, the cross section of the loop tube 10 can be any symmetric shape, such as rectangles and hexagons. The upper and lower symmetric surfaces of the loop tube 10 are made using the etching technique in the microelectromechanics (MEMS). Afterwards, the upper and lower surfaces are combined using the bonding technology.

Furthermore, stimulating electrodes 30 are provided on the substrate 20 under the front end of the loop tube 10. The purpose of these stimulating electrodes 30 is to provide an electrostatic force as the stimulating source of the bending vibrations. If an even number of stimulating electrodes 30 are provided, the positions have to be distributed symmetrically about the central line of the loop tube 10. A small hole 21 is formed on the substrate 20 on each side of the stimulating electrodes. The positions of the small holes 21 are also symmetric about the central line of the loop tube 10.

A through hole is formed on the front end of the loop tube at the position of each of the small holes 21. A reflective mirror 41 is provided for each of the small holes 21 and the through holes 13. A light source 42 is provided on top of each of the through holes 13. A corresponding photo probe 43 is provided under the small hole 21 of the substrate 20. The distance between the reflective mirrors of the associated small hole 21 and through hole 13 is the resonance cavity length of the Fabry-Perot interferometer.

Light emitted from each of the light sources 42 passes the reflective mirrors 41 in the corresponding through hole 13 and the small hole 21. The photo probe 43 receives the optical signals from the interference due to the two reflective mirrors 41. The received optical signals can be computed to obtain the displacement values $1_1$ and $1_2$ shown in FIG. 2. One is then able to compute the fluid flux through the loop tube 10 using Eq. (3). The precision of the Coriolis force type flow meter is determined by the optical properties of the Fabry-Perot interferometer, such as the wavelength of the light from the light source 42, the reflectivity of the reflective mirrors 41, and the length of the resonance cavity.

EFFECTS OF THE INVENTION

Using the Coriolis force type flow meter making use of the Fabry-Perot interferometer according to the invention, the precision of its measurements is higher than the Coriolis force type flow meter developed by Micro Motion, Inc. The positioning and calibration of the interferometer are much easier than the laser measuring system employed in the flow sensor disclosed in the paper "A Coriolis Mass Flow Sensor Structure in Silicon" by Enoksson et. al. Due to the increase in the precision of measurements, the structure of the invention can be further simplified and the voltage required by the stimulator can be lowered. The manufacturing cost of the whole system is greatly reduced.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A Coriolis force type flow meter utilizing a Fabry-Perot interferometer, comprising:

a substrate, which has a stimulating electrode for providing an electrostatic force and two small holes symmetrically formed on opposite sides of the stimulating electrode;

a symmetric loop tube, which is mounted on the substrate, the back end of which having an opening for a fluid to enter and leave, the front end of which being installed on the stimulating electrode and having a plurality of through hole at the position corresponding to each of the small holes; wherein the electrostatic force provided by the stimulating electrode drives the loop tube into bending vibrations;

a plurality of reflective mirrors installed inside the small holes of the substrate and the through holes of the loop tube;

a plurality of light sources installed above the through holes; and a plurality of photo probes installed under the small holes of the substrate;

wherein each of the photo probes extracts interfered optical signals coming from the associated light source and passing through the reflective mirrors in the corresponding small hole and through hole, and the optical signals are used to compute the flux of the fluid flowing through the symmetric loop tube.

2. The Coriolis force type flow meter of claim 1 further comprising a plurality of stimulating electrodes that are symmetrically distributed about the central line of the loop tube.

3. The Coriolis force type flow meter of claim 1, wherein the loop tube is made using chemical etching.

4. The Coriolis force type flow meter of claim 1, wherein the loop tube is rectangular.

5. The Coriolis force type flow meter of claim 1, wherein the reflective mirror in each of the through holes has a specific reflectivity.

6. The Coriolis force type flow meter of claim 1, wherein the distance between the reflective mirrors in the associated small holes and through holes is the resonance cavity length of the Fabry-Perot interferometer.

7. The Coriolis force type flow meter of claim 1, wherein the reflective mirror is made using the film coating technology.

* * * * *